March 14, 1939.                B. THOMSON                    2,150,468
                                COUPLING
                         Filed March 26, 1930           5 Sheets-Sheet 1
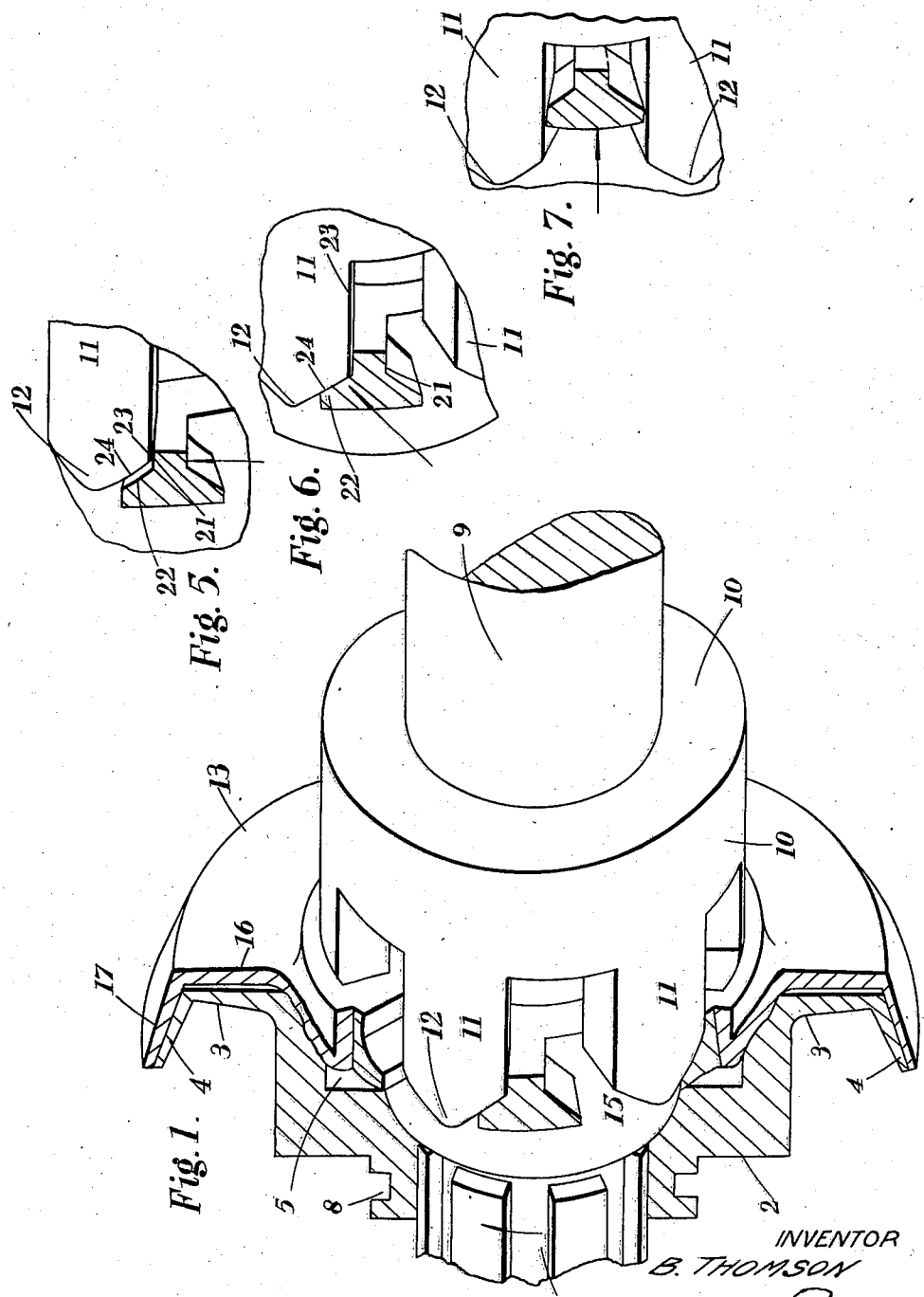
INVENTOR
B. THOMSON
BY
ATTORNEY March 14, 1939.  B. THOMSON  2,150,468
COUPLING
Filed March 26, 1930  5 Sheets-Sheet 2
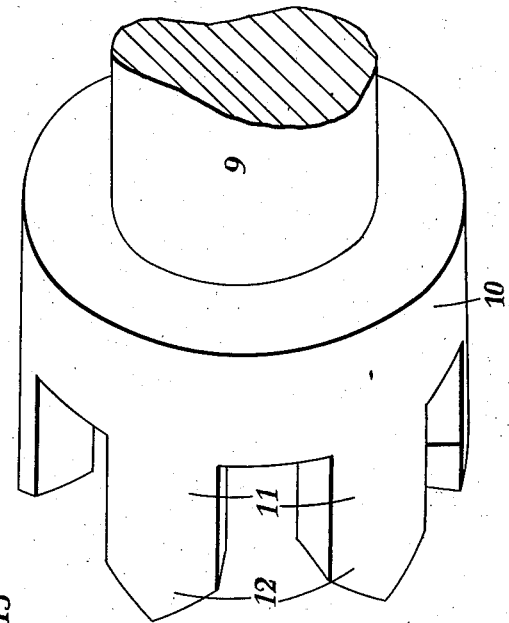
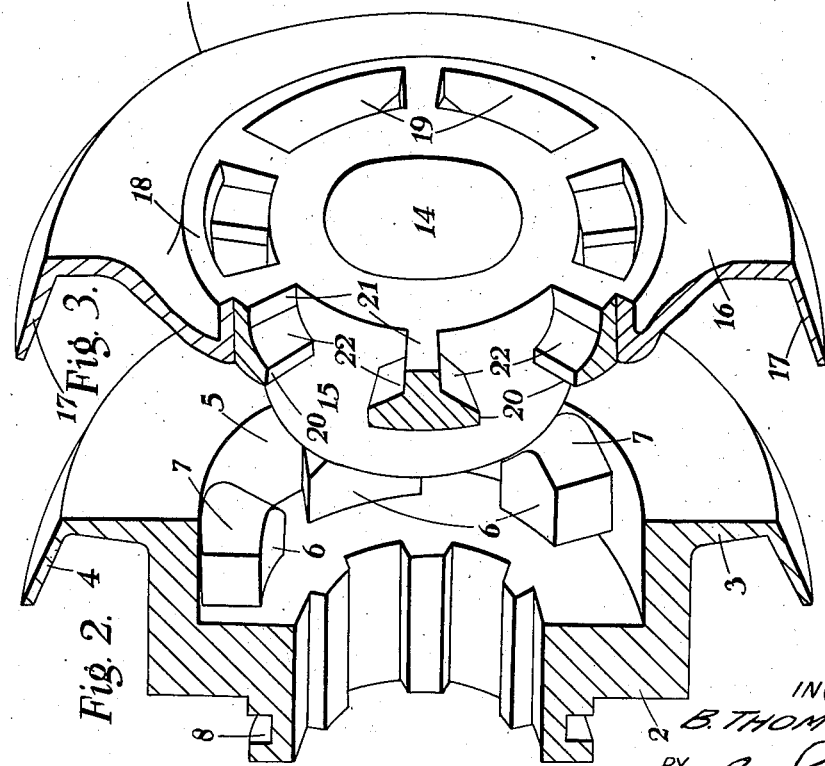
INVENTOR
B. THOMSON
BY
ATTORNEY

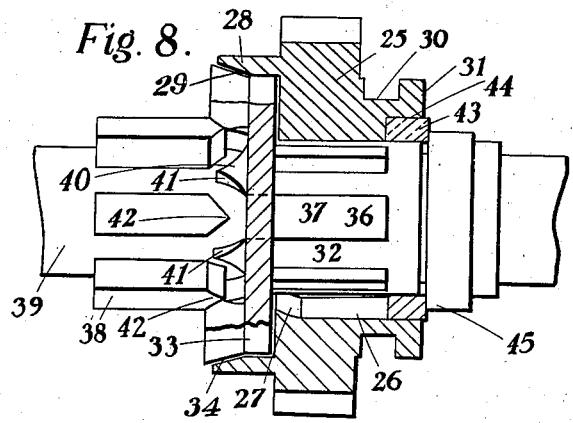
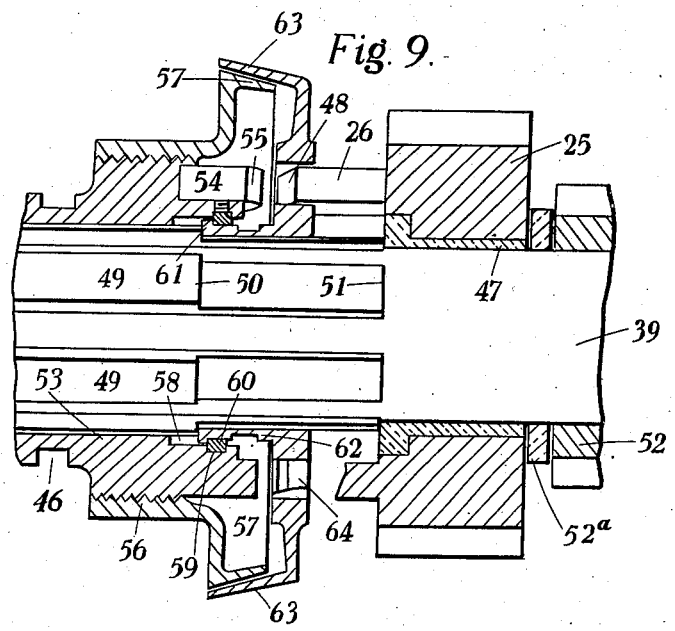

March 14, 1939.  B. THOMSON  2,150,468

COUPLING

Filed March 26, 1930  5 Sheets-Sheet 4

INVENTOR
B. THOMSON
BY
ATTORNEY

Patented Mar. 14, 1939

2,150,468

UNITED STATES PATENT OFFICE 2,150,468

COUPLING

Bernard Thomson, Woldingham, England, assignor to General Motors Corporation, Detroit, Mich., a corporation of Delaware Application March 26, 1930, Serial No. 439,114
In Great Britain April 25, 1929

8 Claims. (Cl. 192—53)

My invention relates to couplings, clutches and like devices for effecting positive engagement of the members to be coupled together, and particularly to the type of such devices in which an intermediate member is associated with the coupling members and acts to prevent the engagement of such members while their speeds are asynchronous.

The object of my invention is to provide an improved device of the type indicated above.

My invention consists in the combination of parts as hereinafter defined in the claims appended hereto.

Referring now to the accompanying drawings,

Figure 1 shows a perspective view, partly in section, of one form of coupling constructed according to my invention.

Figure 2 shows a sectional perspective view of the driving member of the coupling shown in Figure 1.

Figure 3 shows a perspective view, partly broken away, of the intermediate member of the coupling shown in Figure 1.

Figure 4 shows a perspective view of the driven member of the coupling shown in Figure 1.

Figures 5, 6 and 7 show partial perspective views of the driven and intermediate members of the coupling shown in Figure 1, illustrating stages in the engagement of these members.

Figure 8 shows a sectional elevation of a modified form of coupling to that illustrated in Figure 1, while, Figure 9 shows a sectional elevation of a further modification of the same.

Figure 10 shows a part-sectional elevation of another modification of my invention, while

Figure 10:
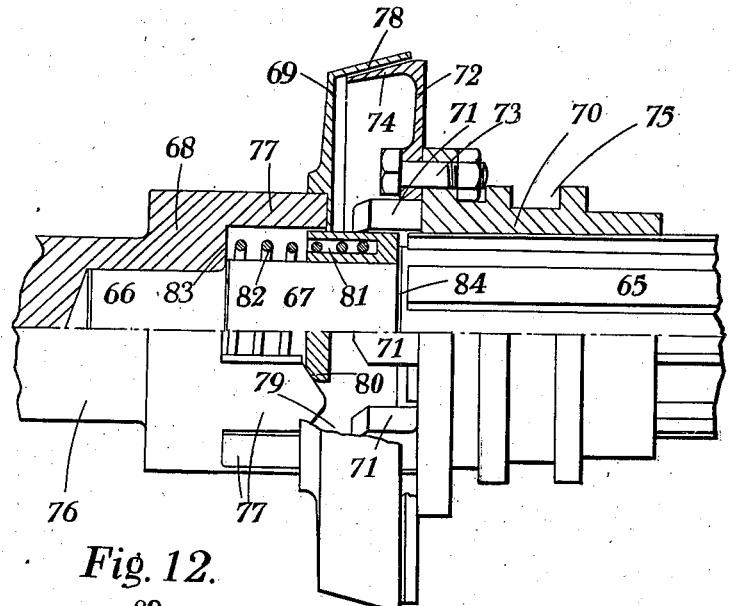

In carrying my invention into effect, according to one form, and as applied, by way of example, to a coupling for positively connecting two shafts in power-transmitting relationship, on one of these shafts, the driving shaft 1, Figure 1, a coupling member 2 is splined and is formed with a flange 3, having a conical rim 4, the external periphery of which acts as a friction surface.

In the coupling member 2 a recess 5, Figure 2, is arranged, in which recess six dogs 6 are formed. The outer ends of the dogs 6 are pointed, the points being formed by oppositely disposed helical surfaces 7. The coupling member 2 is formed with a groove 8, with which an operating fork, not shown, is adapted to engage.

On the other shaft, the driven shaft 9, a second coupling member 10 is rigidly secured, and this coupling member is provided with six axially projecting dogs 11, corresponding to the dogs 6 formed on the coupling member 2, with which former dogs the latter dogs are adapted to engage to positively connect the shafts 1 and 9 in power-transmitting relationship. The ends 12 of the dogs 11 are formed in a similar manner to the ends of the dogs 6.

Between the coupling members 2 and 10 an intermediate member 13 is arranged. The intermediate member 13 is formed with a central hole 14, into which the shaft 1 projects, the intermediate member being rotatable on the shaft.

The intermediate member 13 is formed with a boss 15, which is adapted to be rotatable within the inner faces of the dogs 6, in the recess 5. The intermediate member 13 is also provided with a flange 16, having a conical rim 17 arranged thereon, the inner periphery of which rim forms a friction surface co-acting with the friction surface on the rim 4. The rims 4 and 17 are adapted to act as a friction clutch between the coupling member 2 and the intermediate member 13, so as to form a torque-transmitting connection therebetween.

The flange 16 of the intermediate member 13 is provided with a thickened portion 18, and in this portion a number of apertures 19 are formed. The radial dimensions of the apertures 19 are all equal and correspond to the radial dimensions of the dogs 11, while the circular pitch of the apertures corresponds to the circular pitch of these dogs.

The walls 20 of the apertures 19 are spaced apart so that these portions of the apertures form sliding fits with the dogs 11. The walls 21 of the apertures 19 are spaced apart at greater distances than the walls 20, so that when the points of the dogs 11 are located in these portions, the coupling member 10 may partially rotate through equal angles on opposite sides of the centre line of the apertures.

The walls 20 and 21 are interconnected by walls 22, which are formed as helical surfaces and correspond to the similar surfaces on the points 12 of the dogs 11.

In the disengaged position of the coupling, the friction surfaces on the rims 4 and 17 are just clear of one another, and if it is assumed that the shaft 1 is rotating in the direction of the arrow Figure 1 with a velocity greater than that of the shaft 9, the relative positions of the dogs 11 and the intermediate member 13 are shown in Figure 5, when in the disengaged position.

In Figure 5, it will be seen that the helical surfaces on the ends 12 of the dogs 11 are clear of the correspondingly formed surfaces 22 in the apertures 19 of the intermediate member 13, while owing to the frictional drag between the intermediate member and the shaft 1, one set of the walls 21 of the apertures 19 are held against the faces 23 of the dogs 11.

If now it is desired to couple the shafts 1 and 9 positively together, the operating lever of the coupling member 2 is actuated so as to move this member longitudinally on the shaft 1, towards the coupling member 10.

It is to be understood that in all the coupling operations herein described, the coupling members are not transmitting working loads.

The above actuation of the lever causes the frictional surfaces on the rims 4 and 17 to contact, thus forming a friction clutch between the coupling member 2 and the intermediate member 13, while at the same time, the corresponding helical surfaces 24 on the outer ends of the dogs 11 and on the walls 22 of the apertures 19 on the intermediate member are forced into contact with one another. The position of the parts at this stage is as shown in Figures 1 and 6.

The result of the frictional engagement of the coupling member 2 and the intermediate member 13 is to cause the rotational velocity of the coupling member 10, in virtue of the engagement of the dogs 11 with the apertures 19, to be accelerated, until when synchronism of the coupling members is reached, the surfaces 22 slide over the surfaces 24, causing a partial relative rotation of the intermediate member and the coupling member 10, so that the dogs 11 may now enter the portions of the apertures 19, between the walls 20, as shown in Figure 7, and finally engage with the dogs 6 in the recess 5, so as to couple up the shafts 1 and 9 in positive driving relationship for the transmission of power.

It will be understood that in the above operation of engaging the coupling members 2 and 10, pressure is maintained on the operating lever until the engagement of these parts is complete.

To disengage the coupling, the operating lever is moved in the reverse direction to that above described so as to withdraw the coupling member 2 to its initial position.

The intermediate member 13 may be returned to its initial position by means of a spring or by suitable flange connections to the coupling member 2, appropriate clearances being provided. Either method may be used to bring the intermediate member 13 up against a suitable shoulder, e. g., that formed by the end of the splines, on the shaft 1, the coupling member 2 being adapted to move slightly farther than the intermediate member so as to prevent the frictional surfaces of the rims 4 and 17 from touching each other when the coupling is disengaged. In order to avoid undue complexity in Figure 1, the arrangement for retracting the intermediate member has been omitted, but illustrations of such arrangements are hereinafter given.

The frictional drive between the rims 4 and 17 is only operative during synchronization of the speeds of the coupling members 2 and 10, and after the coupling members 2 and 10 are positively engaged, the whole power is transmitted by the dogs on these members.

When any appreciable difference of velocity exists between the shafts 1 and 9, the intermediate member 13 acts as a lock or mask to prevent engagement of the coupling members 2 and 10, the explanation of the action of the intermediate member being as follows:—

In the operation of coupling up the coupling members 2 and 10, the following forces act on the intermediate member 13, viz., (a) the control force applied by the operating lever to the coupling member 2, the direction of this force being axial, i. e., parallel to the shaft 1, (b) the torque transmitted from the coupling member 2 to the intermediate member 13, through the friction surfaces on the rims 4 and 17, which torque varies proportionately with the applied control force, and (c) the reaction of the coupling member 10 and its attached parts upon the intermediate member 13, this reaction being equal and opposite to the torque transmitted through the intermediate member 13, and consisting of two portions, viz., (1) the frictional bearing drag of the coupling member 10 and its attached parts, and (2) the inertial resistance of the parts to being accelerated by the intermediate member 13. The portion (2) of the reaction I have termed "inertial torque" and it may rise to any value required to balance the torque applied to the coupling member 10 by the intermediate member 13.

In the position of the parts as shown in Figure 5, before the frictional surfaces on the rims 4 and 17 have engaged with one another, and before the helical surfaces 22 and 24 are engaged, the resultant force acting between the dogs 11 of the coupling member 10 and the intermediate member 13 has the direction indicated by the arrow on that figure. The resultant force in this case is the frictional drag of the shaft 1 on the intermediate member 13. When the coupling member 2, with the intermediate member 13, have been moved slightly longitudinally on the shaft 1, so as to bring the frictional surfaces on the rims 4 and 17 into engagement and also the helical surfaces 24 on the dogs 11, and those on the walls 22 of the apertures 19, into engagement, the resistance to acceleration or the inertia of the coupling 10, and its associated parts causes a torque proportional to the control force to be transmitted through the frictional surfaces on the rims 4 and 17 to the intermediate member 13. The direction of the resultant force now acting on the dogs 11 of the coupling member 10 is approximately that indicated by the arrow shown in Figure 6.

Since the greater the applied control force, the greater is the torque transmitted across the friction surfaces of the rims 4 and 17, the direction of the resultant remains substantially constant so long as any substantial difference of speed exists between the coupling members 2 and 10, or so long as any appreciable inertial torque is present.

Under these conditions, it will be seen that the intermediate member 13 and the coupling member 10 are locked together in the position shown in Figure 6, and no further engaging movement of these parts can take place so long as these conditions obtain.

When the speed of the coupling member 10 has reached a value equal to that of the coupling member 2, the inertial torque due to the inertia of the member 10 and its attached parts vanishes, since the friction clutch formed by the rims 4 and 17 cannot accelerate the member 10 to a speed greater than that of the shaft 1. The torque passing through the intermediate member 13 now falls to that of the bearing drag of the coupling member 10 and its associated parts. Under these conditions if the applied control force remains unchanged, the resultant force acting between the intermediate member 13, and the dogs 11 of the coupling member 10, changes its direction to an approximately axial direction as shown in Figure 7.

At a certain point, the direction of the resultant force, as it changes from the position indicated by the arrow in Figure 6, to that indicated by the arrow in Figure 7, passes through the normal to the surfaces 24, and then to an angle beyond the normal equal to the angle of friction between the surfaces 24 and the surfaces of the walls 22, and when this point has been exceeded, the surfaces of the walls 22 slip over the surfaces 24 and cause a partial relative rotation of the intermediate member 13 and the coupling member 10, so that the walls 20 of the apertures 19, of the intermediate member 13, engage with the dogs 11, and on further movement of the coupling member 2, the dogs 11 engage with the dogs 6, thus positively locking the coupling members, and their shafts in power-transmitting relationship, as the intermediate member 13 now offers no resistance to their engagement.

When the partial rotation of the intermediate member 13 and the coupling member 10 commences, the torque transmitted by the intermediate member between the coupling members 2 and 10 has fallen practically to zero.

By suitably proportioning the radii of the rims 4 and 17, their cone angles, and the radii and pitch of the helical surfaces on the walls 22 of the apertures 19 of the intermediate member and likewise the pitch of the helical surfaces on the dogs 11, engagement of the coupling members 2 and 10 will only be effected when synchronism of these parts has been reached, thus effecting smooth engagement of the coupling members.

I have found that with the mean radius of the frictional surfaces on the rims 4 and 17 twice that of the helical surfaces on the walls 22 and the dogs 11, pitch angles of 45 to 55 degrees for these surfaces give satisfactory results, with cone angles of 20 degrees for the rims 4 and 17, but variations from these values may be made.

The control force must in all cases be of such value that the resultant force acting on the surfaces 22 and 24 can overcome the reaction on these surfaces imposed by the frictional resistance of the bearings of the shaft 9, and its associated parts.

If the shafts 1 and 9 are both rotating in the reverse direction to that shown in Figure 1, and the shaft 9 is rotating faster than the shaft 1, the dogs 11 will in the disengaged position of the coupling members, be in the same position as that above described, while if the shaft 1 is rotating slower than the shaft 9, and both are rotating in the direction of the arrow shown in Figure 1, or if the shafts are both rotating in the opposite direction to the arrow shown in Figure 1, and the shaft 1 is rotating faster than the shaft 9, then the dogs 11 in the disengaged position will be in contact with the faces of the apertures 19, opposite to those shown in Figures 1, 5, 6 and 7. The action in all cases is similar to that above described.

In Figure 8, I have shown a modification of my invention as applied to the coupling of a gear wheel to a shaft. In this figure, the gear wheel 25 has dogs 26 formed in or attached to its bore, the dogs being provided with inclined ends 27.

The wheel 25 has an axial annular projection 28, the inner periphery 29 of which is of conical form and acts as a friction surface. A groove 30 for an operating fork is formed on the wheel boss 31.

Within the bore of the wheel 25, an intermediate member 32 is mounted so that it is rotatable within the inner surfaces of the dogs 26. The intermediate member 32 is formed with a flange 33, having an annular extension 34, the external periphery of which is conical and acts as a friction surface. The external periphery of the annular extension 34 is adapted to co-act with the inner periphery 29 of the projection 28, so as to form a friction clutch between the intermediate member 32 and the wheel 25.

The intermediate member 32 is formed with a number of openings 36, the outer ends of which extend as slots 37 through the flange 33. The openings 36 and the slots 37 are formed to correspond to the dogs 38 on the shaft 39. The shaft 39 is prevented from moving longitudinally.

On the intermediate member 32, teeth 40 having inclined surfaces 41 are formed between the slots 37, and these teeth are adapted to engage with the pointed ends 42 of the dogs 38 on the shaft 39, during the initial stage of the engaging operation. The ends 42 of the dogs 38 are formed with plane inclined surfaces as above described.

The intermediate member 32 is formed with a rigidly attached collar 43, which rotates within a recess 44 formed on the wheel 25.

The shaft 39, which carries the dogs 38, is rotatably mounted within the intermediate member 32, and has a shoulder 45 formed thereon which is adapted to act as an abutment for the collar 43 on the intermediate member.

The wheel 25 and the intermediate member 32 are arranged to have a limited amount of longitudinal movement relatively to one another.

In the drawings, the coupling is shown at rest with the members thereof in the disengaged position.

The operation of the device is similar to that above described. In the disengaged position, if the shaft 39 is rotating in the same direction as, and faster than, the wheel 25, one set of inclined faces of the ends 42 of the dogs 38 engages with one or other set of the inclined surfaces 41 of the teeth 40 on the intermediate member according to the direction of rotation of the shaft 39, so that the intermediate member rotates along with the shaft 39, with the friction surfaces on the projection 28 of the wheel 25, and on the extension 34 of the intermediate member 32, just clear of one another, while the collar 43 bears against the shoulder 45 on the shaft 39.

To positively connect the dogs 26 on the wheel 25 with the dogs 38 on the shaft 39, the operating fork is actuated so as to move the wheel 25 longitudinally relatively to the intermediate member 32, and to the shaft 39, and cause the frictional surfaces on the wheel and the intermediate member 32 to engage with one another.

The action of the engagement of these frictional surfaces produces a reaction between the contacting surfaces 41 and 42 of the teeth 40 and the dogs 38, respectively, and owing to the inclination of these surfaces, the reaction between them tends to move the intermediate member 32 to the right and the shaft 39 to the left. Movement of the intermediate member 32 in the above direction is prevented partly by the collar 45, and partly by the friction surface on the wheel 25, while the shaft 39 is prevented from moving longitudinally so that the surfaces 41 and 42 remain in contact with one another. The wheel 25 is speeded up to synchronism with the shaft 39, and continued pressure on the operating lever causes the engaging faces of the teeth 41 to slide over the co-acting faces of the dogs 38, so that these dogs pass through the slots 37 in the flange 33 and project through the openings 36, so as to engage with the dogs 26 in the bore of the wheel 25. The wheel 25 and the shaft 39 are thus positively coupled together in power-transmitting relationship.

The wheel 25 may be uncoupled from the shaft 39 by actuating the operating lever in the reverse direction so as to return the parts to their initial position.

In Figure 9, a modified form of coupling is illustrated for positively connecting a toothed wheel to a shaft. In this figure, the wheel 25 is provided with dogs 26, which project from one of the end faces of the wheel. The wheel 25 is provided with a bushing 47, and is rotatably mounted on the shaft 39. The dogs 26 are as before formed with pointed ends 48.

On the shaft 39, a number of splines 49 are formed the splines being turned down, so as to provided a splined portion of reduced diameter bounded by a set of shoulders 50 at one end and by a second set of shoulders 51 at the other end.

The wheel 25 is rotatably mounted on the shaft 39, between the set of shoulders 51 and the bearing 52, a washer 52a being interposed between the bearing and the wheel.

On the shaft 39, a coupling member 53 is mounted, the bore of this member being formed to engage with the splines 49. The coupling member 53, which is provided with a groove 46 for an operating fork, is formed with a number of axially extending dogs 54. The dogs 54 are formed with pointed ends 55, and correspond to the dogs 26 on the wheel 25.

The periphery of the coupling member 53 is threaded to cooperate with an interiorly threaded annular member 56, the annular member being provided with a conical rim 57, adapted to form a friction surface on its external periphery.

The coupling member 53 is formed with a portion 58 of enlarged bore, having a groove 59 arranged therein, into which groove a split piston ring 60 is sprung. The piston ring 60 is adapted to engage with a shoulder 61 on the intermediate member 62, so as to withdraw the intermediate member along with the coupling member 53, when the latter is being disengaged from the wheel 25.

The intermediate member 62 is provided with a conical rim 63, the internal periphery of which serves as a friction surface. The intermediate member 62 is formed with apertures 64, which correspond in number and disposition to the dogs 26 on the wheel 25. The apertures 64 are formed in a similar manner to the apertures 19, on the intermediate member described with reference to the coupling shown in Figures 1 to 7. The shaft 39 is rotatable within the intermediate member 62, the bore of the intermediate member being smooth.

In the operation of the coupling, if the shaft 39 and wheel 25 are in the disengaged position and the shaft is rotating in the same direction as, but at a greater velocity than the wheel, the intermediate member 62 rotates along with the wheel 25, with the helical walls of the apertures 64 just out of contact with the similar surfaces formed on the dogs 26. If now it is desired to engage the shaft 39 and the wheel 25, pressure is applied to the operating fork so as to move the coupling member 53 towards the wheel 25, and engage the frictional surfaces on the rims 57 and 63 with one another, and also the helical surfaces on the apertures 64 and the dogs 26. The wheel 25 is speeded up to synchronism with the shaft 39, on the attainment of which the dogs 54 may be engaged with the dogs 26, in a similar manner to that described with reference to Figures 1 to 7.

On the withdrawal of the coupling member 53, to disengage the dogs 54 and 26, the piston ring 60 engages with the shoulder 61 of the intermediate member and carries the intermediate member along with it until the shoulder 61 abuts against the set of shoulders 50 of the splines 49.

In Figure 10, another modification of my invention is illustrated. In this figure, the driven shaft 65 is formed with two stepped portions 66 and 67, the portion 66 being journalled within the coupling member 68, while on the portion 67 the intermediate member 69 is slidably mounted and is capable of rotational movement thereon.

On the driven shaft 65, the coupling member 70 is splined and on this member are formed a number of axially projecting dogs 71, provided with pointed ends as before described. To the coupling member 70, an annular member 72 is secured by bolts 73, the annular member being provided with a conical rim 74. The coupling member 70 is formed with a groove 75, for engaging with the fork of an operating lever.

The coupling member 68 is formed integrally with the driving shaft 76 and is provided with a number of axially projecting dogs 77, having their outer ends pointed and corresponding to the dogs 71.

The intermediate member 69 is formed with a conical rim 78, which is adapted to co-act with the correspondingly formed rim 74 on the coupling member 70, so as to form a friction coupling between these parts, when required. The intermediate member 69 is formed with a number of apertures 79, corresponding to the number and spacing of the dogs 77, the radial faces 80 of the apertures being chamfered off, as shown. The parallel portions of the dogs 77 form sliding fits in the apertures.

A recess 81 is formed in the intermediate member 69 for the spiral spring 82, one end of which abuts against the intermediate member while the other end of the spring abuts against the face 83 of the coupling member 68. In the disengaged position of the coupling, the action of the spring 82 holds the intermediate member 69 against the shoulder 84 on the shaft 65. In the figure the coupling is shown in this position.

The chamfered faces 80 of the apertures 79 are equivalent to the inclined faces 41 on the teeth 40 of the coupling illustrated in Figure 8, and the action of the coupling just described is similar to that described with reference to Figure 8, with the exception that when the coupling members 68 and 70 are being engaged, the spring 82 is compressed as the intermediate member 69 is moved towards the left, while when the coupling members are being disengaged, the intermediate member is pressed towards the right against the shoulder 84, and when the coupling members are disengaged, the intermediate member is maintained with one set of the chamfered faces 80 in engagement with one set of inclined faces on the pointed ends of the dogs 77, in readiness for the next engagement of the coupling members.

The above arrangement permits of the complete withdrawal of the coupling member 70, without disturbing the relative position of the intermediate member 69 and the coupling member 68.

Figure 12:
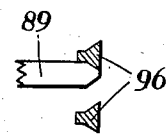
Figure 12 shows a detail view of the teeth of the intermediate member shown in Figure 11.
Figure 11:
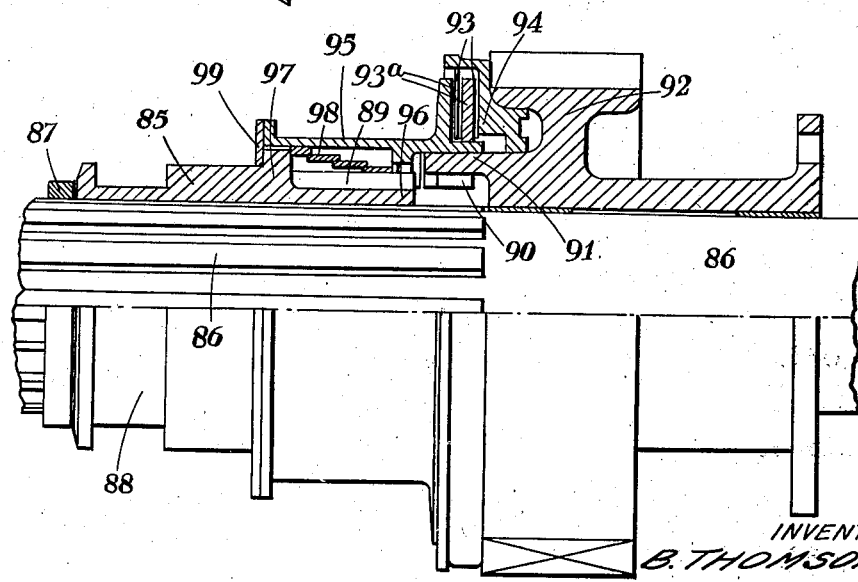
Figure 11 shows a similar view of a further modification.

In Figures 11 and 12, a form of coupling is shown suitable for heavy gearing such, for example, as is used in a Diesel locomotive. In this figure, the coupling member 85 is splined on the shaft 86, and its longitudinal movement thereon towards the left is limited by a stop ring 87. The coupling member 85 is formed with a groove 88 for the operating fork and has a ring of dogs 89 formed on its external periphery, the dogs having their outer ends pointed as above described.

The dogs 89 are adapted to engage with a corresponding ring of similar dogs 90, formed integrally on the boss 91 of the gear wheel 92, which is rotatably mounted on the shaft 86.

On the gear wheel 92, one set of annular discs 93 of a multiple plate friction clutch 94 are mounted, the co-acting set of disks 93a being formed on or mounted on the intermediate member 95.

The intermediate member 95 is rotatably mounted both on the coupling member 85 and on the gear wheel 92, and such member 95 is provided with a set of radially projecting internal teeth 96. The section of the teeth 96 is shown in Figure 12.

Between the teeth 96 of the intermediate member 95, and one face of the collar 97 on the coupling member 85, a volute spring 98 is arranged, while a stop ring 99, attached to the intermediate member 95, is adapted to co-act with the opposite face of the collar 97.

In Figure 11, the coupling is shown in the disengaged position, in which one set of faces of the pointed ends of the dogs 89 engage with one set of chamfered faces on the teeth 96, as shown in Figure 12. The stop ring 99 maintains the discs 93 and disks 93a of the plate clutch 94, in the disengaged position. When the coupling member 85 is moved towards the right to engage the dogs 89 thereon with the dogs 90 on the gear wheel 92, the initial movement of the coupling member 85 carries the intermediate member 95 with it owing to the initial compression of the spring 98, and engages the discs 93 and disks 93a of the plate clutch 94, and causes the gear wheel to be speeded up to synchronism with the driving shaft 86, on the attainment of which condition, the dogs 89 pass through the spaces between the teeth 96, and engage with the dogs 90, so that the coupling member and gear wheel are positively coupled up together, the action being similar to that above described.

When the coupling member 85 is moved towards the left when disengaging the dogs 89 and 90, its movement on the shaft 86 in this direction is limited by the stop ring 87, in which position the stop ring 99 has withdrawn the intermediate member 95, so as to disengage the discs 93 and disks 93a of the plate clutch 94.

Figure 13:
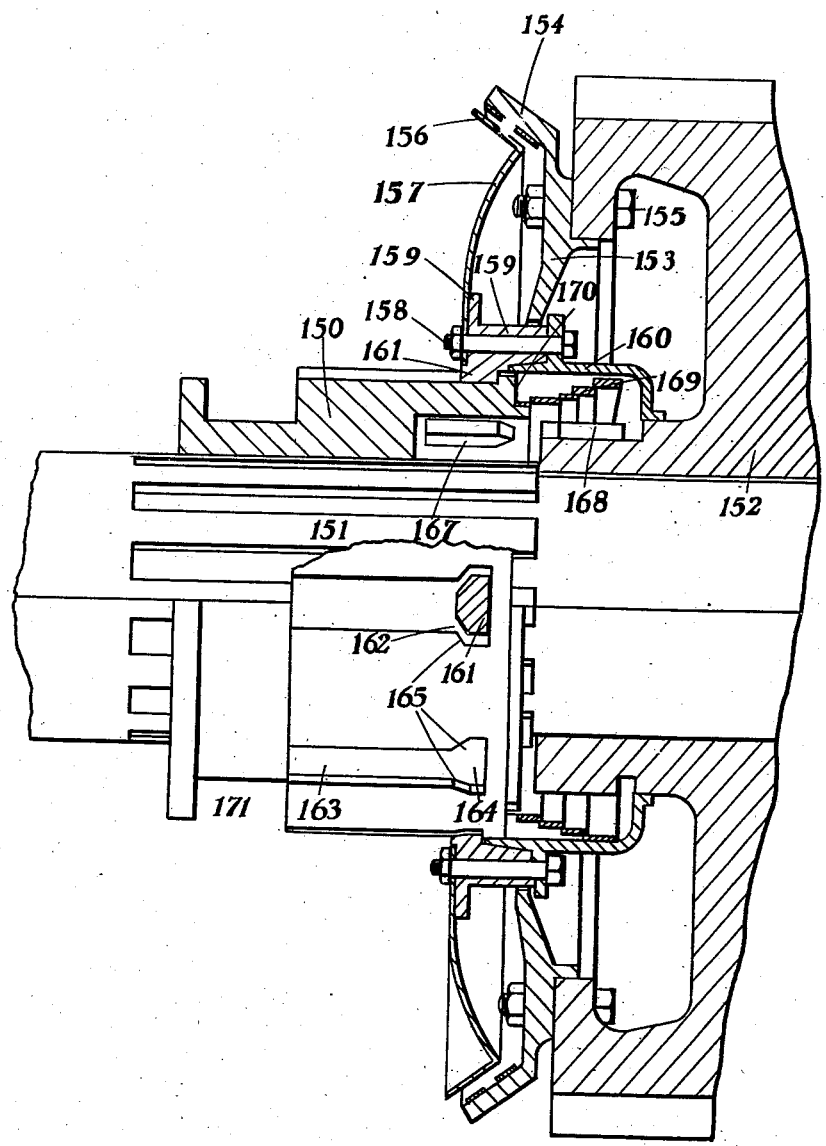
Figure 13 shows a sectional elevation of another modification of my invention.

In the examples of my invention previously described, the intermediate member is positively connected with one of the coupling members by the dogs which transmit the power torque between the coupling members. In Figure 13, I have illustrated an example of my invention suitable for a Diesel locomotive, in which example the intermediate member is positively connected with one of the coupling members by means other than the dogs which transmit the power torque between the coupling members.

In Figure 13, the coupling member 150 is splined on the shaft 151, while the gear wheel 152 is rotatably mounted on this shaft.

An annular member 153, provided with a conical rim 154, is secured to the wheel 152 by the bolts 155. With the rim 154, the conical rim 156 of the annular member 157 is adapted to co-act, the member 157 being secured by means of bolts 158 to a distance ring 159 and an annular bearing member 160. The member 157, ring 159, and member 160, form the intermediate member, and the engagement of the conical rims 154 and 156 provides the required frictional reaction between the intermediate member and the wheel 152, when the coupling of the member 150 and the wheel 152 is being effected.

The ring 159 of the intermediate member is formed with a series of internally projecting teeth 161, which are provided with external chamfered faces 162, and are arranged in slots 163, formed in the periphery of the coupling member 150. The inner ends 164 of the slots 160 are enlarged and are formed at the junctions of the different sized portions of the slots, with chamfered faces 165, corresponding to the chamfered faces 162.

The teeth 161 form sliding fits in the narrower portions of the slots 163, and are capable of a limited amount of movement in the enlarged inner end portions 164 thereof.

The member 160 forms a bearing for the intermediate member on the boss of the wheel 152.

The coupling member 150 is provided with an internal set of dogs 167, while an external ring of dogs 168 are arranged on the wheel 152. The dogs 167 and 168 are formed as before with their opposing ends pointed.

A volute spring 169 is interposed between the shoulder 170 of the coupling member 150 and the bearing member 160 of the intermediate member.

A groove 171 is formed on the coupling member 150, for engaging with an operating fork.

If it is assumed that the coupling member 150 and the wheel 152 are rotating in the same direction at different speeds, and it is desired to couple them together, as one set of the chamfered faces 162 on the teeth 161 of the intermediate member are in contact with one set of chamfered faces 165 on the slots 162, then on pressure being applied to the operating fork so as to press the member 150 towards the right, the conical rims 154 and 156 of the wheel 152, and intermediate member engage with one another and the intermediate member after this engagement takes place, prevents further movement of the coupling member 150 towards the right, in a similar manner to that described with reference to the previous examples, until the speeds of the wheel and coupling member, are synchronised. When this condition is attained, the member 150 may then be moved towards the wheel 152, so as to engage the dogs 167 and 168, and lock the wheel 152 to the coupling member 150, and consequently to the shaft 151.

When the member 150 is returned to its initial position so as to disengage the dogs 167 and 168, the spring 169 maintains the teeth 161 of the intermediate member pressed up against the inner ends of the slots 163.

My invention may be used for variable speed gearing in motor vehicles and also for other purposes such, for example, as the coupling and uncoupling of shafts used to drive propellers operating in elastic or non-elastic fluids, or for the driving of machinery in workshops or in other circumstances in which the transmission of power may be momentarily cut-off during the coupling of any unit to a rotating or stationary shaft.

Again, in all forms of my invention above described, the members, to be coupled together may be engaged with one another at rest as well as when rotating. When the members are at rest and pressure is applied to the operating lever, the helical inclined or conical surfaces of the dogs on the driven member and in the apertures, passages, slots or the like on the intermediate member slide over one another and permit the dogs on the driving and driven coupling members to be engaged directly, i. e. without the provision of any additional means for positioning the intermediate member.

Further, if one of the coupling members is stationary, and the other rotating free of working load, engagement may be effected provided sufficient end force is applied to bring the rotating member to rest and overcome any light torque applied to it such as the oil-drag of a disengaged multiple disc clutch.

I wish it to be understood that my invention is not to be regarded as limited to the examples hereinbefore described, as it will be evident that many modifications may be made therein.

In all the examples of my invention above described, it will be seen that the engagement of the coupling members can only be effected when no inertial torque is being transmitted therebetween by the intermediate member, and that when such inertial torque is being transmitted by the intermediate member, engagement of the coupling members cannot be effected.

The forms of coupling above described are suitable for rotation in one or in both directions.

By means of my invention, an improved form of coupling of the type indicated above, is provided, the coupling being of simple and compact construction and efficient and quick-acting in its operation.

What I claim is:

1. In combination, co-acting power transmitting members having means for positively engaging with one another; and an intermediate member frictionally engageable with one of said power transmitting members and in positive engagement with the other of said power transmitting members, said intermediate member being adapted on the movement to engage said power transmitting members to synchronize their speeds and prevent engagement of same while their speeds are asynchronous, said means on one of said power transmitting members for the positive engagement therewith of its co-acting power transmitting member acting also for the positive engagement of the intermediate member therewith.

2. In combination, a shaft having dogs with pointed ends and a shoulder spaced longitudinally on said shaft from said dogs, a gear wheel having dogs with pointed ends formed in its bore, said dogs being adapted to co-act with said dogs on said shaft to positively engage said wheel and said shaft when desired, said wheel having a friction surface, and an intermediate member rotatably mounted in the bore of said wheel so as to have a limited axial movement relatively thereto and having one of its ends in the disengaged position contacting with said shoulder on said shaft, said intermediate member having a friction surface engageable with the friction surface on said wheel and having spaced openings corresponding to the arrangement of said dogs on said shaft and teeth with pointed ends formed at one end of said openings, said intermediate member having the teeth thereon normally in engagement with the points of said dogs on said shaft and being adapted on the movement to engage said wheel and said shaft to frictionally engage with said wheel and after synchronizing the speeds of said wheel and said shaft, to permit said dogs on said shaft to engage said dogs in the bore of said wheel.

3. In combination, a shaft having stepped splines formed thereon, a coupling member engaging with said splines on said shaft and slidable thereon and having pointed dogs, a friction member having a conical friction rim secured to said coupling member, a gear wheel loosely mounted on said shaft and in fixed longitudinal relation thereto, said gear wheel having pointed dogs, an intermediate member journalled on the reduced splined portion of said shaft between said gear wheel and said coupling member, said intermediate member having a conical friction rim engageable with said friction rim on said friction member and having openings with which the points of said dogs on said gear wheel engage in the disengaged position of said coupling member, said intermediate member on the engaging movement of said coupling member being adapted to be frictionally interconnected therewith and after synchronizing the speeds of said wheel and said coupling member, to permit of positive engagement of said dogs on said wheel and said coupling member, together with means for returning said intermediate member along with said coupling member to the disengaged position.

4. In combination, a shaft having splines formed thereon and two stepped portions, a coupling member having pointed dogs formed thereon engaging with said splined portion of said shaft, a conical friction member attached to said coupling member, an intermediate member journalled on the stepped portion of said shaft adjacent to said splined portion thereof, said intermediate member having a conical friction rim engageable with the friction rim on said friction member and having passages therein having inclined wall portions, a second coupling member mounted on said stepped portion of said shaft adjacent to said portion thereof on which said intermediate member is mounted, said coupling member being formed with pointed dogs thereon, the points of said dogs engaging with said passages in said intermediate member in the disengaged position of said coupling members, said intermediate member being adapted to synchronize the speeds of said coupling members before permitting of engagement of same, together with a spring interposed between said second-mentioned coupling member and said intermediate member.

5. The combination of engageable and disengageable clutch members equipped with interlockable dogs; an intermediate member having means for operatively engaging both clutch members to bring them to equal speeds and prevent engagement of said clutch members while their speeds are unequal, said means consisting of a frictional element for engaging one clutch member and positive elements in constant engagement with the dogs of the other member.

6. The combination of engageable and disengageable clutch members equipped with interlockable dogs; an intermediate member frictionally engageable with one of said clutch members and in positive engagement with the other, said intermediate member having axial passageways therethrough with inclined checking surfaces in the side walls of said passageways, the dogs of said other clutch member having their ends disposed in said passages and capable of passing through said passages to interlock said clutch members.

7. The combination of engageable and disengageable clutch members having interlockable dogs; an intermediate member frictionally engageable with one of said clutch members and in positive engagement with the other, said intermediate member having passageways extending axially therethrough, the side walls of said passageways being formed with inclined checking surfaces between their ends, and the dogs of said other clutch member have inclines on their ends corresponding to the inclined checking surfaces on the intermediate member and being capable of passing through said passages to effect positive engagement between said clutch members.

8. The combination of a pair of engageable and disengageable dog clutch members the dogs of one of which has pointed ends; an intermediate member having axially directed passageways therethrough with oppositely disposed inclined surfaces between their ends thereby forming passages wider at one end than at the other, said dogs with pointed ends being disposed within the wider ends of the passages in the disengaged position of the clutch members, means for effecting frictional engagement of said intermediate member with the other clutch member when the two clutch members are caused to approach, and a journal bearing for the intermediate member on said other clutch member to maintain said intermediate clutch member coaxial therewith at all times.

BERNARD THOMSON.